Sept. 16, 1958  S. H. SVENSSON  2,851,920
ARRANGEMENT FOR RECORDING REFRACTIVE INDEX AND ITS
DERIVATIVE IN STRATIFIED SOLUTIONS
Filed Sept. 11, 1953  2 Sheets-Sheet 1
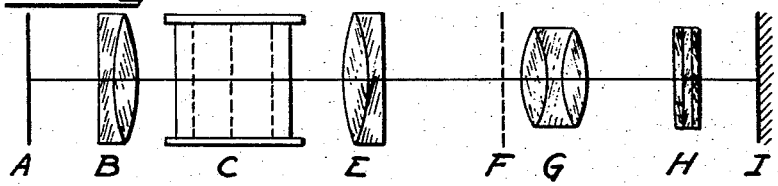
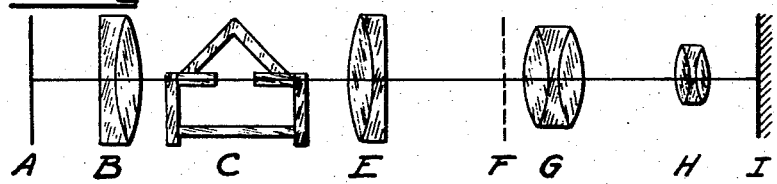
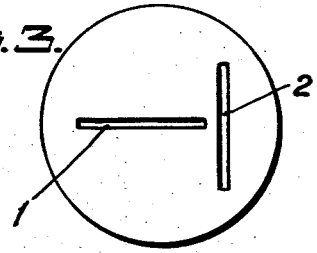
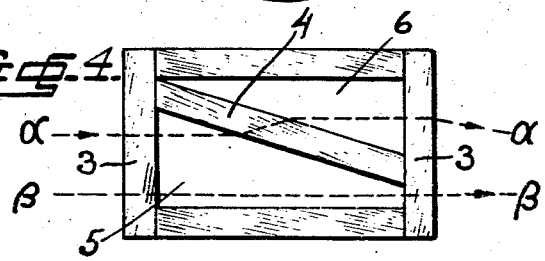
Inventor
Svante Harry Svensson
by Pierce, Scheffler + Parker
attys

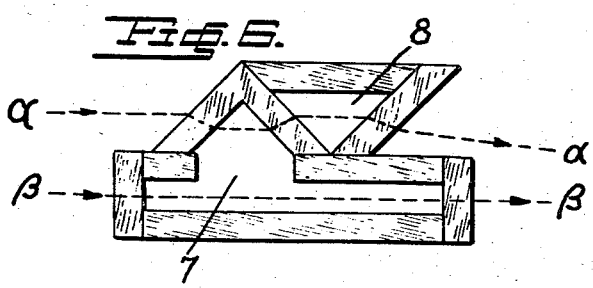
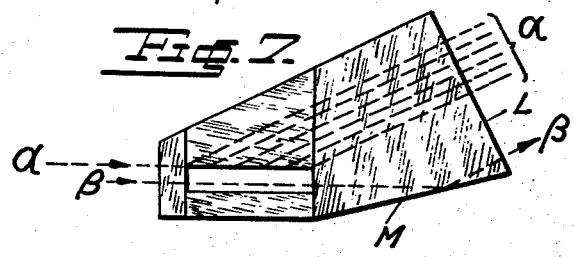
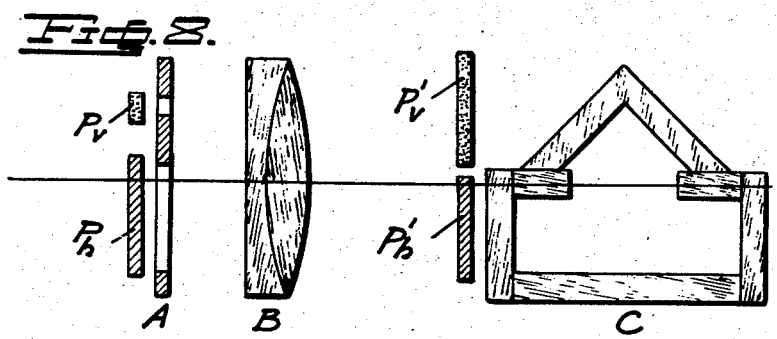
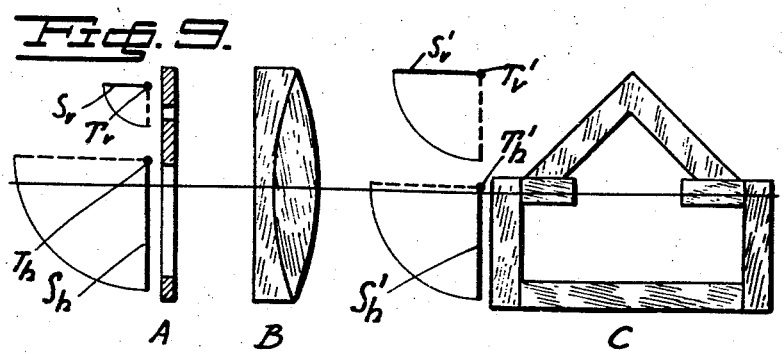

United States Patent Office 2,851,920
Patented Sept. 16, 1958

2,851,920

ARRANGEMENT FOR RECORDING REFRACTIVE INDEX AND ITS DERIVATIVE IN STRATIFIED SOLUTIONS

Svante Harry Svensson, Sundbyberg, Sweden, assignor to LkB-Produkter Fabriksaktiebolag, Stockholm, Sweden, a Swedish company Application September 11, 1953, Serial No. 379,638

Claims priority, application Sweden September 11, 1952

5 Claims. (Cl. 88—14)

On optical concentration analysis of stratified solutions in a curvette there is need of recording the concentration as well as its first derivative with respect to the vertical co-ordinate. The reasons for this have been analysed by the inventor in an article in Acta Chemica Scandinavica 3, 1170 (1949). Arrangements for carrying out such a combined concentration recording by way of refractive index have also been described by the inventor, see e. g. Acta Chemica Scandinavica 4, 399 (1950) and 5, 1301 (1951). These arrangements are combinations between the known arrangement according to Philpot for recording the refractive index derivative (Nature 141, 283, 1938) and the recently invented astigmatic modification of Rayleigh's interference refractometer for recording the refractive index function (Calvet, Compt. rend, Acad. Sci. 220, 597, 1945; Philpot and Cook, Research 1, 234, 1948), Both are served by the same lens system, and the result is either two separate pictures, one showing the refractive index function, the other showing the course of the derivative through the cell, or a combined picture in which the two functions are found superposed over or intimately united with each other. The present invention serves the same purpose, but it is carried out in another way which concerns the recording of the refractive index function. While in the above-mentioned inventions optical interference in monochromatic light gives a whole system of mutually congruent and equidistant interference fringes, the refraction of light in the specially designed cell gives in the present invention rise to one single or a few bright curves on the dark background. The important drawbacks of already known inventions are partly due to the fact that the multi-interference fringe patterns are rather tiresome for the eye during the evaluation and partly due to the low light intensity resulting from the necessity of using monochromatic light. In the present invention both these inconveniences are removed. If desired, one gets one single curve of the refractive index function as well as of the derivative. Monochromatic light is not necessary, but a rather broad spectral range from a white lamp can be used. On the other hand, the present invention requires more complicated sample cells.

The invention makes use of the same lens system as the above-mentioned arrangements. Thus the following items are used, namely a lamp (e. g. an incandescent lamp), a light filter (e. g. interference filter), a condensing lens, a slit arrangement containing at least one horizontal and one vertical slit, a collimating lens which makes the light from the said slits parallel, further the specially designed sample cell, a lens which refracts the parallel light to an optical image of the slits, whereafter an astigmatic lens system, giving in the vertical section an optical image of the cell and in the horizontal section an image of said slit images, and in the mentioned image plane a photographic film or plate. In the first image plane of the slits the partially light-obstructing device, which is necessary for recording the derivative, is situated.

It is characteristic of this invention that the recording of the derivative as well as that of the function are based on those angular deflections which the light suffers on passing the cell. Within the solution itself a vertical deflection takes place which is proportional to the refractive index derivative, and this angular deflection is translated by the optical system to a horizontal linear displacement on the plate in a way that is known and has been described in Philpot's work cited above. This recording requires that part of the cell carries walls perpendicular to the light pencils. When light rays pass from oblique walls to the solution or vice versa, however, horizontal angular deflections also take place which are approximately linear functions of the refractive index and independent of the value of the derivative. These horizontal angular deflections can also be translated to horizontal linear displacements on the plate by the same lens system.

The invention will be more fully described in connection with the accompanying drawings, in which Figs. 1 and 2 show an optical system in which the simultaneous recording of both functions according to the above principles, which is the object of this invention, can be effected, the former figure showing the system in elevation, the latter in plan, Fig. 3 shows the light source diaphragm, A in Figs 1–2, from the direction of the radiation, Figs. 4–7 show cross sectional views of some embodiments of sample cells useful in the invention, Fig. 8 shows an arrangement with optical polarizers for segregation of the light beams serving the two different records, and Fig. 9, finally, shows an arrangement similar to that of Fig. 8 but containing mechanical stops instead of polarizers.

The lens system depicted in Figs. 1–2 is characterized by optical imagery from plane A to plane F, and from plane F to plane I in plan, and by optical imagery from the middle of the cell C to the plane I in elevation. This double optical imagery from two different planes on to the same plane I, where the photographic film or plate is situated, is made possible by the cylindrical lens H, which has no focal power in elevation.

The gradient recording of a variable refractive index in the cell C requires at A a light source slit which is perpendicular to the refractivity gradient (which will be assumed to be vertical), at C a cell with mutually parallel entrance and exit walls, and at F a partially light-obstructing device, consisting of a diagonally placed edge, slit or bar. The functioning of this system is explained in Philpot's work cited above, and is roughly the following. Due to the optical imagery from A to F, an optical image of the slit at A is formed in the plane F. This slit image suffers, however, a vertical deflection proportional to the local refractivity gradient in the cell. In the plane F, we consequently have an illuminated rectangle, formed by a multitude of deflective slit images. The inclined edge, slit or bar in this plane is adjusted to form the diagonal of this rectangle, and has the function of transforming the vertical deflection into a horizontal displacement (of the point of intersection between light-obstructing edge and slit image). This horizontal displacement is, due to the optical imagery from F to I in plan, transferred into a horizontal displacement on the photographic plate of the boundary between light and dark areas. The horizontal coordinate on the plate I thus becomes proportional to the refractivity gradient in the cell, whereas the vertical coordinate is related to the level in the cell, because of the optical imagery from C to I in elevation.

The recording of the refractivity function itself requires at A a slit parallel to the refractivity gradient in the cell (assumed to be vertical), at C a prismatic cell with a vertical refracting edge, and in the plane F no obstruction of the light. The functioning of this recording is the following. Considering again one single light pencil, its vertical coordinate on the plate I is determined by the level in the cell C at which it passed, due to the optical imagery from cell to plate in elevation. On the other hand, the horizontal coordinate which the pencil acquires at the plane I is determined by the horizontal coordinate at the plane F, because these two planes are optically conjugate in plan. The horizontal coordinate in the plane F is, further, determined by the lateral deflection which the light from the vertical slit at A has suffered in the prismatic cell, which deflection is, in turn, determined by the local refractivity value at the level where the pencil passed the cell.

A simultaneous recording of both the refractivity function and its gradient is, according to the present invention, effected by designing cells with one prismatic and one planoparallel part, by using a light source diaphragm with at least one vertical and at least one horizontal slit, by having in the plane F a partially light-obstructing device which does not obstruct light coming from the vertical slit, and, possibly, but not necessarily, by designing means for preventing light from the vertical slit from passing through the plano-parallel part of the cell, and a means for preventing light from the horizontal slit from passing through the prismatic part of the cell. Figure 4 shows a horizontal section of a possible cell construction. The walls perpendicular to the direction of light and the diagonal partition wall must be optically distortion-free.

The cell consists of two compartments 5 and 6, of which 5 contains the stratified solution with a variable refractive index, while 6 contains the solvent (constant refractive index). The chamber 5 has the form of a cut right-angle triangle and can be said to be composed of one plano-parallel and one triangular part. Pencils α which pass through the triangular part also pass through chamber 6, and their horizontal refraction gives a record of the refractive index function. Pencils β which pass through the plano-parellel part are only deflected vertically and give a record of the refractive index derivative. The triangular part of 5 and the whole of 6 form together a so called double prism or differential prism, which is known to give a lateral deflection which is approximately proportional to the difference in refractivity between the liquids in the chambers.

The horizontal section of another possible construction is shown on Figure 5. This cell functions only if it is submerged into a bath of a liquid of as closely as possible the same refractive index as the solution to be recorded. For the rest no comments are necessary.

In the construction according to Figure 6, the chamber 7 is for the stratified solution, while the compartment 8 shall contain the solvent. Such a cell, as well as that in Figure 4, can be used in air. It is characterized by a greater linear range than that in Figure 4.

A construction in which the cell proper is plano-parallel but the glass walls prismatic, is shown in Figure 7. The pencil α enters here one cell wall under grazing incidence, the ray consequently acquiring the direction of the critical angle of total reflection. The prism surface L is perpendicular to the direction of the α rays which results when the cell is filled with solvent. The optical axis of the lens system following after the cell has the same direction as these α rays. A change in the refractive index in the cell gives rise to a ray direction different from that of the optical axis. The pencil β is reflected after the cell passage by the prism surface M and becomes, after this reflection, parallel with the pencils α. The very small aperture which the α ray beam must have on the light source side of the cell is compensated by the considerable light intensity that can be gained by the use of one in the vertical plane extended slit. The aperture of the β-ray beam is equal to the whole breadth of the cell, but the corresponding light source is almost just a point in the vertical plane (horizontal slit).

This and similar arrangements have the important disadvantage of requiring strictly monochromatic light. It must therefore be considered inferior to the first-mentioned constructions.

An unlimited number of other cell constructions are also possible. The invention is naturally not limited to the cell constructions described here, which merely aim at elucidating the principle of simultaneous horizontal and vertical light deflection.

The recording of the refractive index function has to be served by a vertical, that of the derivative by a horizontal slit. The slit arrangement at the light source must therefore contain these two slits side by side. A possible construction of the light source diaphragm (plane A) suitable for a combined optical recording is shown in Fig. 3. Further horizontal and vertical slits can then be added without altering the principle of measurement. The consequence thereof is only the formation of as many refractivity curves as one has vertical slits and as many derivative curves as one has horizontal slits. The advantage of such an arrangement is that the range of measurement can be extended, because one curve can be tied together with the next of the same kind to form a picture which is greater than the available image field.

The pencils α should come from the vertical slit (slits) only, while the pencils β should originate only from the horizontal one (ones). In order to prevent light from the respective kind of slits from illuminating the improper part of the sample cell, different measures can be taken. Thus one can use optical polarizers in front of or behind the slit arrangement, the polarizer at the vertical slit (slits) being oriented perpendicular to the polarizer at the horizontal one (ones). The corresponding optical polarizers are placed in front of or behind the cell. This method of segregation is illustrated in Fig. 8, where $P_v$ and $P_v'$ are vertically oriented, $P_h$ and $P_h'$ horizontally oriented optical polarizers. Instead of this very convenient method of segregation, mechanical stops can of course also be used. This is illustrated in Fig. 9, where $S_h$ is a stop for the horizontal slit, $S_h'$ one for the plano-parallel part of the cell, whereas the corresponding stops for the vertical slit and for the prismatic part of the cell are called $S_v$ and $S_v'$ respectively. All stops can be rotated round vertical axes $T_h$, $T_h'$, $T_v$, and $T_v'$. If they are constructed in such a way that they can be opened and closed rapidly and conveniently, the two curves can be exposed on the same plate at a very short time interval. Finally it is in fact possible to get a sufficiently good result without any segregation of the light rays. If the light from the vertical slit is allowed to pass through the plano-parallel part of the cell tool, this light will be refracted to one single sharp, straight, bright line on the plate. Such a line does not harm, on the contrary it can serve as good reference line from which all measurements on the plate are made. On the other hand, if the light from the horizontal slit is allowed to pass through the prismatic part of the cell, it is true that this will give rise to unwanted stray light on the plate, but if hard photographic material and a hard developer is used, it is probable that this stray light becomes unimportant.

What we claim is:

1. An optical arrangement for the simultaneous recording of the refractivity and its gradient in cells with stratified solutions, comprising a light source illuminating a diaphragm with at least one vertical and at least one horizontal slit, in the way of the radiation from said light source diaphragm a dioptric system giving optical imagery of said light source diaphragm, in the neighbourhood of said dioptric system a sample cell for the stratified solution to be recorded, said cell having one plano-parallel part oriented essentially perpendicularly to the radiation, and one prismatic part with a vertical refracting edge, in the optical image plane of said light source diaphragm a partially light-obstructing device which is a mechanical construction element with at least one sharp edge between optically transparent and opaque material, said edge cutting the optical image of the horizontal light source slit at an acute angle, and said light-obstructing device being designed so as to give free passage to the light from the vertical light source slit, in the way of the radiation from said light-obstructing device, finally, a light-indicating device and an astigmatic dioptric system designed and adjusted so as to make said light-indicating device optically conjugate to the cell in a vertical section through the optic axis and optically conjugate to said light-obstructing device in a horizontal section through the optic axis.

2. An optical arrangement according to claim 1 in which the space for the solution in the cell is prismatic in shape, while the walls of the cell are essentially plano-parallel.

3. An optical arrangement according to claim 1 in which the space for the solution in the cell is essentially right-angled and parallelepipedic, but in which at least one cell wall traversed by light is prismatic.

4. An optical arrangement according to claim 1 comprising in the way of the radiation from the horizontal light source slits an optical plane-polarizing element and in the way of the radiation through the prismatic part of the cell a similar polarizing element oriented so as to extinguish the radiation from said light source slits.

5. An optical arrangement according to claim 1 comprising, in the way of the radiation from the horizontal light source slits a removable mechanical stop and in the way of radiation through the prismatic part of the cell a similar removable mechanical stop.

References Cited in the file of this patent

UNITED STATES PATENTS

| | | |
|---|---|---|
| 2,612,814 | Glasser | Oct. 7, 1952 |
| 2,630,042 | Sheffer et al. | Mar. 3, 1953 |

OTHER REFERENCES

"The Determination of Refractive Index," by Ferguson, O. M., pages 236–238 in The Optician of November 10, 1944.

"An Optical Arrangement for Getting Simultaneous Records of Refractive Index and its Derivative for Stratified Solutions," by Svensson, Acta Chem. Scan., vol. 4, 1950, pages 399–403.